(12) United States Patent
Kwack et al.

(10) Patent No.: US 10,011,100 B2
(45) Date of Patent: Jul. 3, 2018

(54) SLIT NOZZLE AND METHOD OF MANUFACTURING DISPLAY APPARATUS USING THE SAME

(71) Applicant: SAMSUNG DISPLAY CO., LTD., Yongin, Gyeonggi-Do (KR)

(72) Inventors: Jun-Ho Kwack, Yongin (KR); Sung-Sang Ahn, Yongin (KR); Young-Sik Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 694 days.

(21) Appl. No.: 14/102,345

(22) Filed: Dec. 10, 2013

(65) Prior Publication Data
US 2015/0013900 A1   Jan. 15, 2015

(30) Foreign Application Priority Data
Jul. 12, 2013   (KR) .................. 10-2013-0082443

(51) Int. Cl.
*B05B 1/04*   (2006.01)
*B32B 37/12*   (2006.01)
(Continued)

(52) U.S. Cl.
CPC ............ *B32B 37/1284* (2013.01); *B05B 1/04* (2013.01); *B05B 1/044* (2013.01); *B05C 9/06* (2013.01); *B05C 5/027* (2013.01); *B05C 5/0254* (2013.01); *B29C 47/26* (2013.01); *B32B 37/10* (2013.01); *B32B 2037/1253* (2013.01); *B32B 2310/0831* (2013.01); *G02F 1/1303* (2013.01); *G02F 2202/023* (2013.01); *G02F 2202/28* (2013.01)

(58) Field of Classification Search
CPC ......... B05B 1/04–1/044; B05C 5/0254; B05C 5/0266; B05C 9/06; B29C 47/26
See application file for complete search history.

(56) References Cited

U.S. PATENT DOCUMENTS 3,807,917 A * 4/1974 Shimoda ................. D01D 5/34
   264/172.15
4,476,165 A * 10/1984 McIntyre .............. B05C 5/0254
   118/411
(Continued)

FOREIGN PATENT DOCUMENTS

KR   10-2007-0065599   6/2007
KR   10-2008-0066604   7/2008
(Continued)

OTHER PUBLICATIONS

KIPO Office action dated Aug. 11, 2014, for Korean priority Patent application 10-2013-0082443, (5 pages).

*Primary Examiner* — Dah-Wei D. Yuan
*Assistant Examiner* — Stephen A Kitt
(74) *Attorney, Agent, or Firm* — Lewis Roca Rothgerber Christie LLP

(57) ABSTRACT

A slit nozzle includes: a first head, a second head facing the first head; and a plurality of cores located between the first head and the second head, wherein the plurality of cores includes: a first core and a third core for coating a coating solution; and a second core located between the first core and the third core so that coating of the coating solution via the first core and the third core is achieved at different instants of time.

8 Claims, 7 Drawing Sheets

(51) Int. Cl.
*B05C 9/06* (2006.01)
*B29C 47/26* (2006.01)
*B32B 37/10* (2006.01)
*G02F 1/13* (2006.01)
*B05C 5/02* (2006.01)

(56) References Cited

U.S. PATENT DOCUMENTS

| | | | | |
|---|---|---|---|---|
| 4,584,830 A | * | 4/1986 | Faure | D02G 3/367 |
| | | | | 57/12 |
| 5,533,675 A | * | 7/1996 | Benecke | B05B 7/0861 |
| | | | | 239/413 |
| 6,423,144 B1 | | 7/2002 | Watanabe | |
| 2004/0256496 A1 | * | 12/2004 | Harris | B05C 5/0258 |
| | | | | 239/551 |

FOREIGN PATENT DOCUMENTS

| | | |
|---|---|---|
| KR | 10-2010-0064499 | 6/2010 |
| KR | 10-2013-0047090 | 5/2013 |

* cited by examiner

SLIT NOZZLE AND METHOD OF MANUFACTURING DISPLAY APPARATUS USING THE SAME

CROSS-REFERENCE TO RELATED APPLICATION

This application claims priority to and the benefit of Korean Patent Application No. 10-2013-0082443, filed on Jul. 12, 2013, in the Korean Intellectual Property Office, the content of which is incorporated herein in its entirety by reference.

BACKGROUND

1. Field

One or more embodiments of the present invention relate to a slit nozzle, and more particularly, to a slit nozzle for forming a display apparatus.

2. Description of the Related Art

In the manufacturing of a display apparatus, a display panel and a window can be bonded together by using an optical adhesive (e.g., optical clear adhesive (OCA) tape) or by hardening (curing) a resin via ultraviolet (UV) rays. When an optical adhesive is used, the entire thickness of the panel increases due to the thickness of the optical adhesive, and the adhesive strength is low. Thus, bonding by UV hardening a resin is usually used. However, when a resin is used, the resin cannot be coated in a desired shape due to the fluidity thereof, and accordingly, a defect rate in such a process of manufacturing a display apparatus increases.

SUMMARY

Aspects of one or more embodiments of the present invention are directed toward a slit nozzle for sheet coating and line coating.

Additional aspects will be set forth in part in the description which follows and, in part, will be apparent from the description, or may be learned by practice of the presented embodiments.

According to one or more embodiments of the present invention, a slit nozzle includes: a first head and a second head facing each other; and a plurality of cores located between the first head and the second head, wherein the plurality of cores includes: a first core and a third core for coating a coating solution; and a second core located between the first core and the third core so that coating of the coating solution via the first core and the third core takes place at different instants of time.

The first head may include at least one injection port through which the coating solution is injected.

The first core is configured for sheet coating, and the third core is configured for line coating.

The first core may include a first concave part having a first width at a bottom thereof, the first concave part being obtained by removing a lower portion of the first core.

The second core may include at least one through opening.

The at least one through part may be formed so that a partial region thereof overlaps the first concave part.

The third core may include a plurality of second concave parts each having a second width at the bottom thereof, the second concave parts being separated from each other by a first distance.

The plurality of second concave parts may be formed so that a partial upper region thereof overlaps the at least one through part.

The first head may include at least one injection port through which the coating solution is injected.

According to one or more embodiments of the present invention, a slit nozzle includes: a first head and a second head facing each other; a core located between the first head and the second head; and a plurality of line dispensers located on a surface of the second head facing away from the core. The core is configured for sheet coating, and the plurality of line dispensers is configured for line coating.

According to one or more embodiments of the present invention, a method of manufacturing a display apparatus includes: forming a resin layer including a first resin layer and a second resin layer on a window along a first direction; and attaching a panel on the resin layer, wherein the first resin layer has a width narrowing (e.g., gradual or smooth narrowing) from a bottom surface to a top surface thereof, and the second resin layer is formed on both sides of the top surface of the first resin layer along the first direction.

The width of the top surface of the resin layer may be equal to a width of a lower surface of the panel.

The first resin layer may be formed by sheet coating, and the second resin layer may be formed by line coating.

The method may further include performing an ultraviolet (UV) pseudo-hardening process on the resin layer between the forming of the resin layer and the attaching of the panel.

The attaching of the panel may include: pressing the panel on the top surface of the resin layer in a vacuum state; and attaching the panel on the resin layer by performing a UV hardening process to bond the panel and the window.

The method may further include performing an autoclaving process after the attaching of the panel.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

To fully understand the present invention, operational advantages of embodiments of the present invention, and objects obtained by embodiments of the present invention, the following description will refer to the attached drawings illustrating the embodiments of the present invention and contents written in the attached drawings.

The present invention will now be described more fully with reference to the accompanying drawings, in which example embodiments of the invention are shown. Like reference numbers are used to refer to like elements throughout the drawings.

Figure 1:
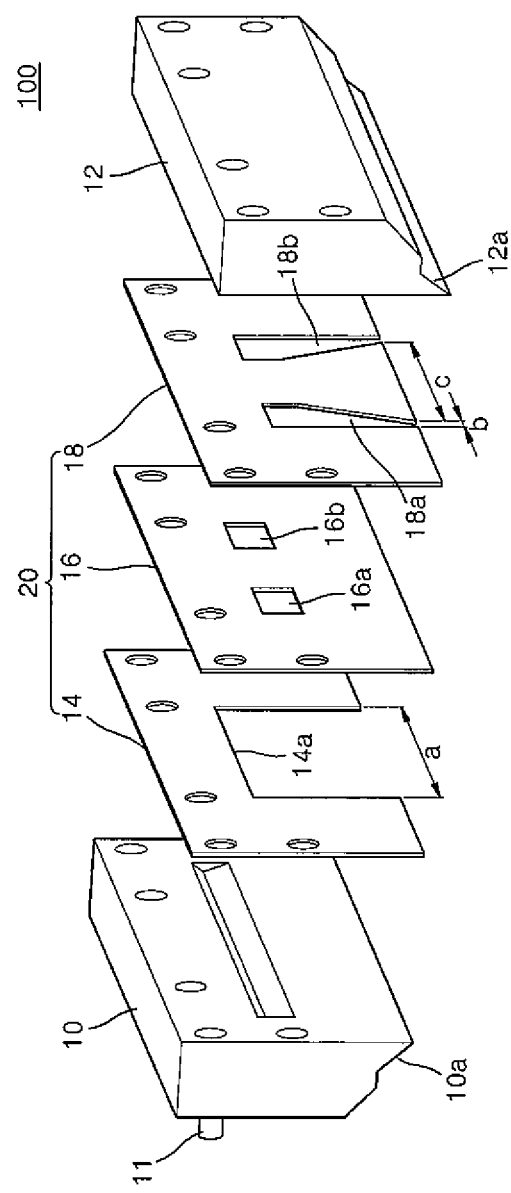
FIG. 1 is an exploded perspective view of a slit nozzle according to an embodiment of the present invention.

FIG. 1 is an exploded perspective view of a slit nozzle 100 according to an embodiment of the present invention.

Referring to FIG. 1, the slit nozzle 100 includes first and second heads 10 and 12 facing each other and a plurality of cores (e.g., core plates) 20 (including first to third cores 14, 16, and 18) located between the first and second heads 10 and 12.

Each of the first and second heads 10 and 12 is formed of a metallic block having a rectangular parallelepiped shape; and protrusion parts (protrusions) 10a and 12a, each protruding at an acute angle, formed at lower parts near side surfaces of the first and second heads 10 and 12 that face each other. The first head 10 includes at the rear part (rear surface facing away from the second head 12) at least one injection port (or inlet port) 11 for injecting a coating solution. Although one injection port 11 is shown in FIG. 1, a plurality of injection ports 11 may be formed. Also, the injection port 11 may be formed at another position instead of the rear part of the first head 10. The coating solution may be, for example, a resin, but the present invention is not limited thereto.

According to an arrangement of the first to third cores 14, 16, and 18 with respect to the first head 10, the injection port 11 may be formed at the rear part of the first head 10. However, when the first core 14, the second core 16, and the third core 18, are rearranged so that the third core 18, the second core 16, and the first core 14 are located sequentially from left to right between the first head 10 and the second head 12, the injection port 11 may be formed at the rear part (rear surface facing away from the first head 10) of the second head 12 instead of the rear part of the first head 10. The first and second heads 10 and 12 may be formed of, for example, stainless steel (SUS), but the present invention is not limited thereto.

Each of the plurality of cores 20 may be formed as a thin plate.

The first core 14 includes a first concave part (a first slit) 14a having a first width a at the bottom thereof. The first concave part 14a is obtained by removing a lower portion of the first core 14. The second core 16 includes a plurality of (e.g., two) through parts (through openings or holes) 16a and 16b formed at least in a partial region thereof to overlap the first concave part 14a. The third core 18 includes a plurality of (e.g., two) second concave parts (second slits) 18a and 18b that are separated from each other by a first distance c at the bottom thereof, each of them having a second width b at the bottom thereof in a lower portion of the third core 18. The plurality of second concave parts 18a and 18b may be formed to have a lower width that is narrower than an upper width. However, the present invention is not limited thereto.

The plurality of second concave parts 18a and 18b are formed so that partial (a portion of the) upper regions thereof overlap the plurality of through parts 16a and 16b of the second core 16, respectively. In addition, the plurality of second concave parts 18a and 18b are formed so that partial (a portion of the) lower regions overlap the first concave part 14a of the first core 14.

Since the first core 14 includes the first concave part 14a, sheet coating may be formed, for example, on a window through the first concave part 14a. The coating solution injected through the injection port 11 of the first head 10 may move to the first core 14 so that sheet coating is performed along the first width a on the window through the first concave part 14a.

In addition, the coating solution which has moved from the first head 10 to the first core 14 may move to the plurality of second concave parts 18a and 18b of the third core 18 via the plurality of through parts 16a and 16b of the second core 16 so that line coating may be performed on the window along the bottom of the second concave parts 18a and 18b having the second width b.

The first width a of the first concave part 14a of the first core 14 and the second width b of each of the plurality of second concave parts 18a and 18b of the third core 18 may vary according to a width of the coating solution to be formed on the window.

Unlike the first concave part 14a and the plurality of second concave parts 18a and 18b respectively formed at the lower portion of the first core 14 and the lower portion of the third core 18, the second core 16 does not have a concave part formed at a lower portion thereof and includes the plurality of through parts 16a and 16b respectively formed in set or predetermined regions thereof to overlap the first concave part 14a and the plurality of second concave parts 18a and 18b.

Due to the second core 16, sheet coating via the first core 14 and line coating via the third core 18 with the plurality of through parts 16a and 16b may be performed on a given area of a substrate at different time instants (with a time lag in between). In more detail, by disposing the second core 16 having the plurality of through parts 16a and 16b between the first core 14 and the third core 18 (so that the third core 18 is behind the first core 14 in space), solutions may be coated via the first core 14 and the third core 18 at different time instants (i.e., a coating solution is first coated on a given area via the first core 14, and then coated on the given area via the third core 18 after a time lag which it takes for the slit nozzle to travel forward so that the third core 18 reaches the same given area), and thus, due to the time lag, line coating may be performed on the coating deposited using sheet coating.

Figure 2:
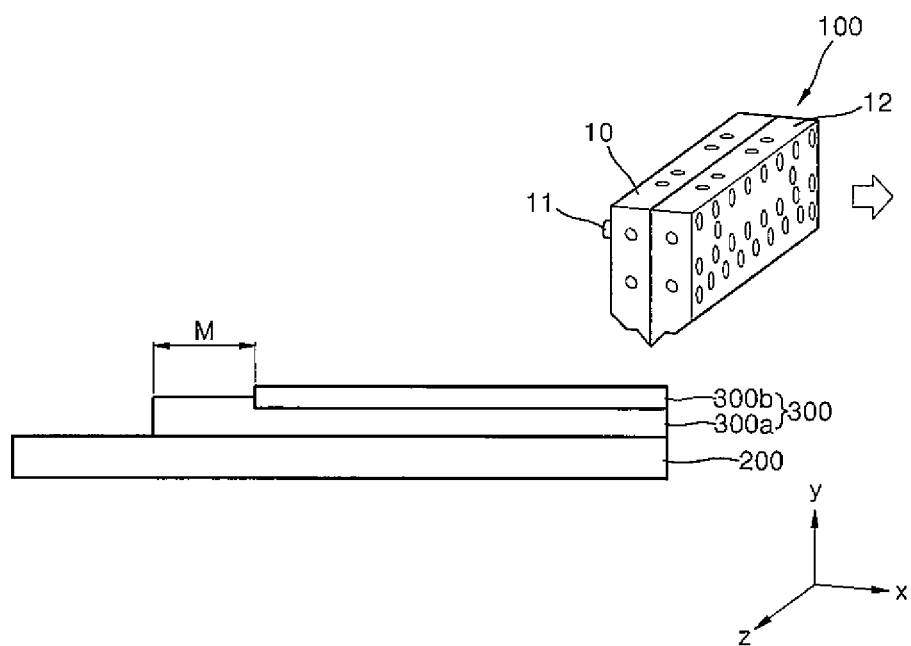
FIG. 2 is a side view for describing a process of forming a resin layer on a window by using the slit nozzle according to an embodiment of the present invention.

FIG. 2 is a side view for describing a process of forming a resin layer 300 on a window 200 by using the slit nozzle 100 according to an embodiment of the present invention.

Referring to FIGS. 1 and 2, when a resin is used as the coating solution injected through the injection port 11 of the first head 10, the resin is ejected through the first concave part 14a of the first core 14 to form a first resin layer 300a on the window 200.

In addition, a second resin layer 300b is formed on the first resin layer 300a with an arbitrary length difference M from one side of the first resin layer 300a.

The second resin layer 300b may be formed through the plurality of second concave parts 18a and 18b of the third core 18 by using the ejected resin, and the arbitrary length difference M is obtained due to the use of the second core 16 located between the first core 14 and the third core 18 (which delays the dispensing of the resin through the third core 18 upon initiation of the coating process by the additional distance the resin has to travel to reach the third core 18, and the length difference M is determined by the speed the slit nozzle moves relative to the window 200, and the time is takes for the resin to travel from the first core 14 to the third core 18).

If the second core 16 is not located between the first core 14 and the third core 18, since the resin is ejected through the first concave part 14a of the first core 14 and the plurality of second concave parts 18a and 18b of the third core 18 at the same time, the second resin layer 300b cannot be formed on the first resin layer as shown in FIG. 2, and instead, one resin layer will be formed.

Figure 3:
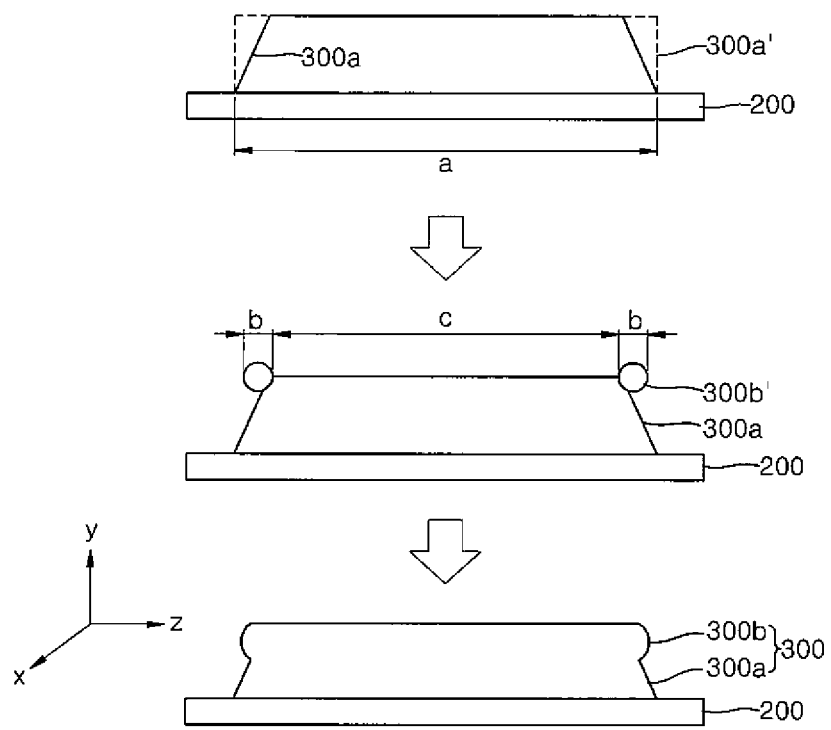
FIG. 3 is a cross-sectional view showing the process of forming a resin layer by using the slit nozzle in FIG. 2 according to an embodiment of the present invention.

FIG. 3 is a cross-sectional view showing the process of forming the resin layer 300 by using the slit nozzle 100 from FIG. 2 according to an embodiment of the present invention.

Referring to FIGS. 1 and 3, the first resin layer 300a having the first width a is formed on the window 200 via the first core 14. The first resin layer 300a is formed by sheet coating via the first core 14 and has different widths at lower (bottom) and upper (top) portion thereof. That is, the lower portion (towards the window 200) of the first resin layer 300a has the first width a, and the upper portion (away from the window 200) of the first resin layer 300a has a narrower width than the first width a. Due to the nature of the coating fluid, a rectangular-shaped first resin layer 300a' cannot be formed, the first resin layer 300a formed on the window 200 has a trapezoid shape inclined from top to bottom.

Resins forming resin layer 300b' each having a second width b are coated on both upper side ends (both sides of the top surface) of the first resin layer 300a through the plurality of second concave parts 18a and 18b of the third core 18 by passing through the first core 14 and the second core 16.

The resins in resin layer 300b' coated on both upper side ends of the first resin layer 300a flow downward due to gravity, thereby forming the second resin layer 300b on the first resin layer 300a. The second resin layer 300b and the first resin layer 300a may be joined together to form the resin layer 300 having a larger (total) width than the width of the upper portion of the first resin layer 300a.

A panel may be placed on the resin layer 300. Since the resin layer 300 having a larger width at an upper portion thereof than the first resin layer 300a can be formed by joining the first resin layer 300a and the second resin layer 300b, the panel and the window 200 may be efficiently bonded.

A third width c, which is a distance between the plurality of second concave parts 18a and 18b of the third core 18 through which the coating solution is coated to form the second resin layer 300b, may be adjusted so that the upper surface of the second resin layer 300b matches the upper surface of the first resin layer 300a (e.g., the third width c is substantially the same as the width of the the upper surface of the first resin layer 300a). The third width c may be determined by considering the physical properties such as the viscosity of a resin coated on the window 200, an injection speed of the resin injected through the injection port 11 of the first head 10, a degree of pseudo-hardening after coating the resin to form the first resin layer 300a and the second resin layer 300b, and the like. However, the present invention is not limited thereto, and other factors may be considered.

Figure 4:
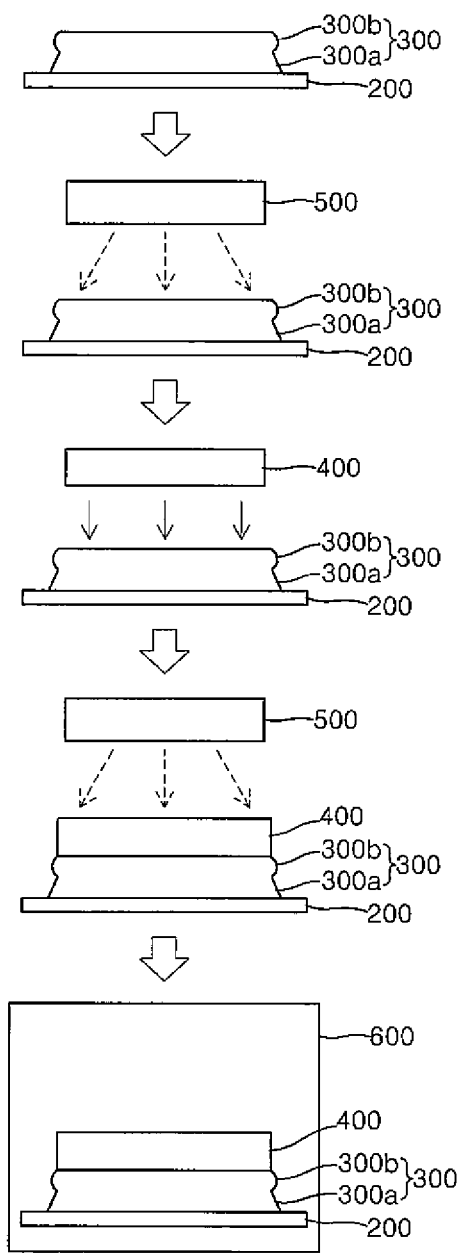
FIG. 4 is a cross-sectional view for describing a process of bonding a window and a panel with a resin by using the slit nozzle according to an embodiment of the present invention.

FIG. 4 is a cross-sectional view for describing a process of bonding the window 200 and a panel 400 via a resin by using the slit nozzle 100 according to an embodiment of the present invention.

Referring to FIG. 4, the resin layer 300 is formed on the window 200 by using the slit nozzle 100.

The resin layer 300 includes the first resin layer 300a formed on the window 200 by sheet coating and the second resin layer 300b formed on both upper side ends of the first resin layer 300a by line coating.

A pseudo-hardening process using an optical irradiation unit 500 is performed to maintain a shape of the resin layer 300 which flows down due to gravity according to resin characteristics.

In the pseudo-hardening process, an initial (a minimum degree of) hardening to maintain the shape of the resin layer 300 may be selected to perform a following hardening process for bonding the resin layer 300 and the panel 400. The optical irradiation unit 500 may be, for example, a UV lamp. However, the present invention is not limited thereto.

The panel 400 is pressed on the resin layer 300 in a vacuum state. The lower width of the panel 400 may be substantially the same as the upper width of the resin layer 300, and thus, a contact area between the panel 400 and the resin layer 300 may be enhanced (e.g., maximized).

The hardening process using the optical irradiation unit 500 is performed so that the panel 400 and the window 200 are bonded by the resin layer 300.

An autoclaving process may be optionally performed in a chamber 600 to remove air bubbles from the panel 400 and the window 200 bonded together by the resin layer 300.

Figure 5:
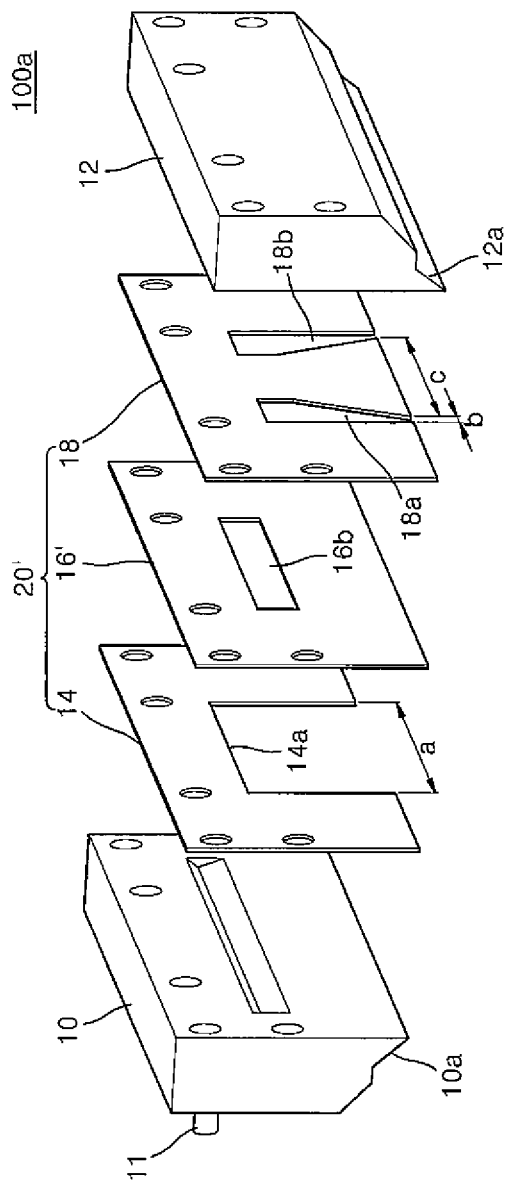
FIG. 5 is an exploded perspective view of a slit nozzle according to another embodiment of the present invention.

FIG. 5 is an exploded perspective view of a slit nozzle 100a according to another embodiment of the present invention. In FIGS. 1 and 5, like reference numbers refer to like elements, and thus, their repetitive descriptions will not be repeated.

Referring to FIG. 5, the slit nozzle 100a includes a plurality of (e.g., two) heads 10 and 12 and a plurality of cores 20' located between the plurality of heads 10 and 12.

The plurality of cores 20' includes first to third cores 14, 16', and 18.

Unlike the second core 20 of FIG. 1, the second core 20' includes a single through part (through hole) 16b and is used for time differentiating coating of a coating solution moving from the first core 14 to the third core 18.

Figure 6:
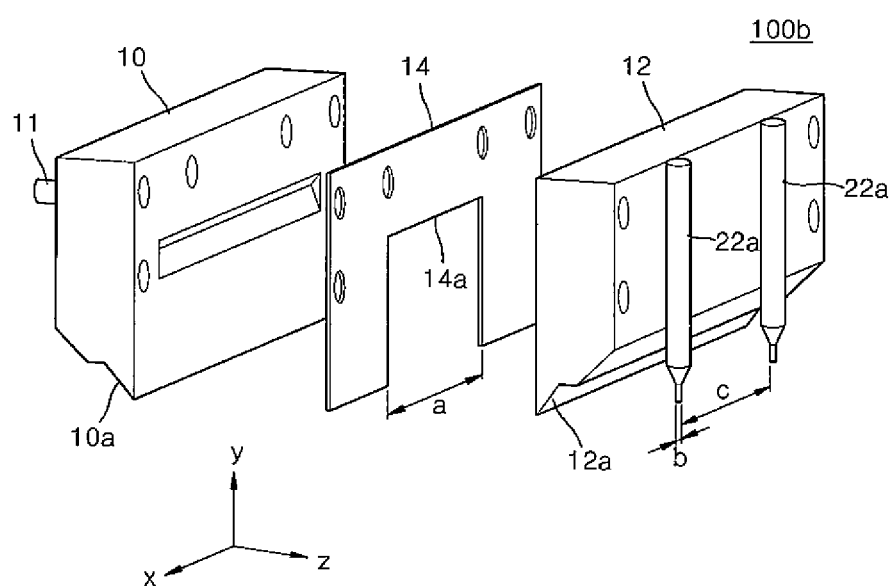
FIG. 6 is an exploded perspective view of a slit nozzle according to another embodiment of the present invention.

FIG. 6 is an exploded perspective view of a slit nozzle 100b according to another embodiment of the present invention. In FIGS. 1 and 6, like reference numbers refer to like elements, and thus repetitive descriptions will not be repeated.

Referring to FIG. 6, the slit nozzle 100b includes the first and second heads 10 and 12, a core 14 located between the first and second heads 10 and 12, and a plurality of line dispensers 22a located on a surface of the second head 12 that is opposite to another surface contacting the core 14.

The plurality of line dispensers 22a are for line coating and may eject a coating solution at a different instant of time from sheet coating performed via the core 14.

The time difference between the coating of the coating solutions ejected by the core 14 and the plurality of line dispensers 22a may be achieved via the second head 12 located between the core 14 and the plurality of line dispensers 22a. Alternatively, the time difference between the coating of the coating solutions ejected by the core 14 and the plurality of line dispensers 22a may be adjusted by individually adjusting a time when the coating solution is ejected from the plurality of line dispensers 22a.

When the slit nozzle 100b moves in a first direction (-z direction), the plurality of line dispensers 22a should be formed on the rear surface (facing away from the first head 10) of the second head 12 because the coating solution ejected from the plurality of line dispensers 22a should be coated on the coating solution ejected from the core 14. However, when the slit nozzle 100b moves in a second direction (z direction) opposite to the first direction (-z direction), the plurality of line dispensers 22a should be formed on the rear surface (facing away from the second head 12) of the first head 10, i.e., the surface on which the injection port 11 is formed, instead of the rear surface of the second head 12 to eject the coating solution from the plurality of line dispensers 22a on the coating solution ejected from the core 14.

Figure 7:
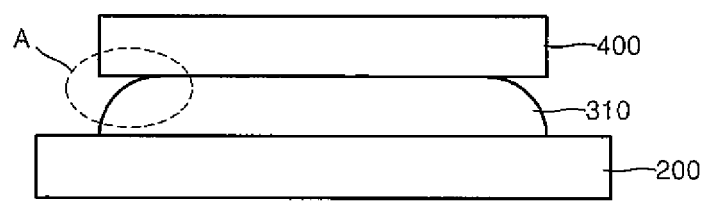
FIGS. 7 and 8 are cross-sectional views showing a window and a panel bonded after performing sheet coating of a resin on the window by using a slit nozzle including only a single core for sheet coating.
Figure 8:
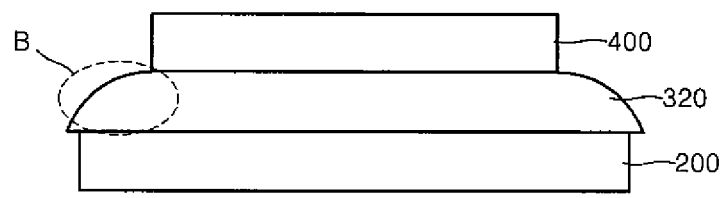

FIGS. 7 and 8 are cross-sectional views showing bonding of the window 200 and the panel 400 after performing sheet coating of a resin on the window 200 by a slit nozzle including only a single core for performing sheet coating.

Referring to FIG. 7, a resin layer 310 located between the window 200 and the panel 400 has a shape having a convex upper part or a trapezoid shape since the resin coated on the window 200 flows down due to gravity according to its characteristics. In particular, since exfoliation (an unfilled gap) A may occur between the panel 400 and the resin layer 310 at both ends of the resin layer 310 due to a gradient of the resin layer 310, defects may occur when the panel 400 and the window 200 are bonded.

Referring to FIG. 8, to prevent defects, such as the exfoliation described with reference to FIG. 7, the resin is excessively coated on the window 200 in a comparable method, and accordingly, an adhesive strength between the lower part of the panel 400 and the upper part of a resin layer 320 may increase. However, in this case, an overflow problem occurs as the resin layer 320 flows over both ends of the window 200.

When a slit nozzle capable of performing only sheet coating is used, exfoliation or overflow may occur in a process of bonding a window and a panel. However, according to an embodiment of the present invention, a nozzle structure capable of performing both sheet coating and line coating is used to thereby prevent bonding defects and accordingly increase the reliability of a display apparatus.

In addition, although bonding of a window and a panel by using a slit nozzle is illustrated, the present invention is not limited thereto.

Since the components shown in the drawings may be magnified or reduced for convenience of description, the present invention is not limited to the sizes or shapes of the components shown in the drawings, and it will be understood by one of ordinary skill in the art that various changes in form and details may be made therein without departing from the spirit and scope of the present invention as defined by the following claims, and equivalents thereof.

What is claimed is:

1. A slit nozzle comprising:
a first head having at least one injection port;
a second head facing the first head; and
a plurality of cores located between the first head and the second head,
wherein the plurality of cores comprises:
a first core for coating a first resin layer and a third core for coating a second resin layer;
a second core located between the first core and the third core so that coating via the first core and the third core takes place at different instants of time, and the second resin layer is coated on the first resin layer, and
a coating solution injected from a same injection port of the at least one injection port of the first head is configured to flow to both the first core to coat the first resin layer and the third core to coat the second resin layer.

2. The slit nozzle of claim 1, wherein:
the first core is configured for sheet coating; and
the third core is configured for line coating.

3. The slit nozzle of claim 1, wherein:
the first core comprises a first concave part having a first width at a bottom thereof, the first concave part being obtained by removing a lower portion of the first core.

4. The slit nozzle of claim 3, wherein:
the second core comprises at least one through part.

5. The slit nozzle of claim 4, wherein:
the at least one through part is located so that a partial region thereof overlaps the first concave part.

6. The slit nozzle of claim 4, wherein:
the third core comprises a plurality of second concave parts each having a second width at a bottom thereof, the second concave parts being separated from each other by a first distance.

7. The slit nozzle of claim 6, wherein:
the plurality of second concave parts are located so that a partial upper region thereof overlaps the at least one through part.

8. The slit nozzle of claim 6, wherein:
the plurality of second concave parts are located so that a partial lower region thereof overlaps the first concave part.

* * * * *